May 5, 1931.　　　G. JOHNSON　　　1,804,370
SEPARABLE FASTENER
Filed April 29, 1929
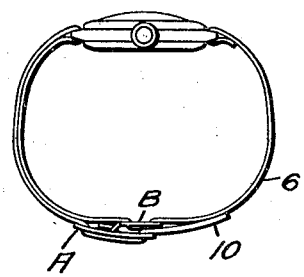
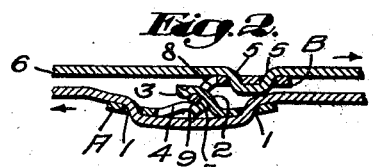
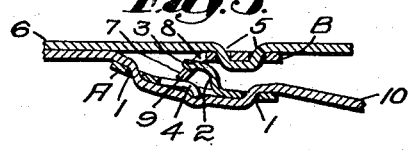
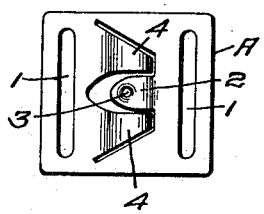
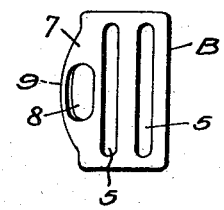
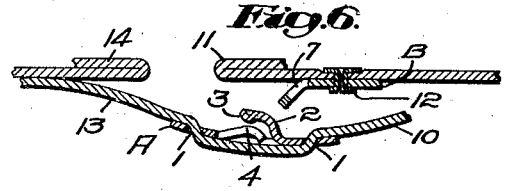
Inventor:
Gustav Johnson
by Emery, Booth, Varney & Townsend
Attys Patented May 5, 1931

1,804,370

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENER

Application filed April 29, 1929. Serial No. 359,039.

My invention aims to provide improvements in separable snap fasteners of the hook and eye type.

In the drawings, which illustrate a preferred embodiment of my invention:—

Figure 1 is an elevation of a watch and wrist strap showing my improved fastener attached to the strap;

Fig. 2 is a longitudinal section through the strap and fastener showing the parts of the fastener in normal engagement;

Fig. 3 is a section similar to Fig. 2, but showing the manner of separating the fastener;

Fig. 4 is a plan of the plate part of the fastener which presents the hook;

Fig. 5 is a plan of the plate part of the fastener which presents the eye or hook engaging portion; and Fig. 6 is a section showing the fastener when disengaged and showing the eye-presenting plate secured in fixed relation to the flap of an overshoe or the like, the hook-engaging portion being shown in elevation.

Referring to the embodiment of my invention illustrated by the drawings, I have shown a hook and eye type of fastener which has its plate-like parts made of sheet metal and which has a snap action during engagement and disengagement of the parts. This device is particularly, though not exclusively, adapted for use as a fastener for overshoes, gloves, wrist watches and the like and may be readily separated by a lifting action exerted at a predetermined side of the fastener. In the drawings I have shown the use of the fastener on a wrist watch strap.

The fastener is made in two separate parts which may be rigidly or slidably attached to a support. The part A is pressed from sheet metal and is shown (Figs. 2 and 4) with two strap-receiving slots 1—1. Between the slots 1—1 I have pressed out of the material a hook 2 having a boss 3 adjacent to its free end. At each side of the hook (Fig. 4) I have provided a spring finger 4, each of which is arched slightly in cross-section (Fig. 2) and is spaced below the under side of the hook for purposes hereinafter described.

The other plate-like part B is also pressed from sheet metal and in Figs. 1 through 5 is shown provided with two slots 5—5 through which the strap 6 passes. A hook-engaging portion 7 is provided at one edge of the part B and it has an aperture 8 therethrough (Fig. 5) for receiving the hook 2, as shown in Fig. 2. The hook-engaging portion extends from the plate part B at an angle to the plane thereof to facilitate engagement with and disengagement from the hook 2.

When engaging the fastener members the hook 2 is entered into the aperture 8 and the portion 9 of the hook-engaging portion 7 is forced between the hook and the spring fingers 4, as shown in Fig. 2. A definite snap action takes place, as the portion 9 passes by the boss 3, due to the yielding nature of the spring fingers. Thus, the spring fingers 4 and the boss 3 cooperate to hold the hook and eye against accidental separation.

To separate the fastener it is merely necessary to pull outwardly upon the end portion 10 of the strap 6, as clearly illustrated in Fig. 3.

When the fastener elements are engaged they are securely locked against separation by any stresses which are exerted upon the strap in the directions of the arrows indicated in Fig. 2. Even though there may be substantial stress exerted upon the strap in the directions of the arrows (Fig. 2) the fastener may be readily and easily separated by a pull on the free end 10 of the strap. While there may be slight yielding of the hook 2 I prefer to have the spring fingers do the yielding to permit separation of the fastener so that the hook will not become distorted.

As an example of the various uses of my fastener, I have shown, in Fig. 6, the plate B secured to one flap 11 of an overshoe by means of one or more rivets 12. The plate A is secured to a strap 13 attached to the cover flap 14 of the overshoe.

The arrangement of the fastener plates may be varied to suit particular use and the formation of the plates and elements thereof may be varied to some extent without departing from the nature of my invention. Therefore, while I have illustrated and described in detail certain forms of my invention, I do not wish to be limited thereby, as my invention is best defined by the following claims.

Claims:

1. A snap fastener device comprising, in combination, a one-piece plate member formed from sheet metal and having a hook portion and yieldable finger means normally pressing toward said hook portion, said hook portion and said yieldable finger means being formed from the material of said plate member and located substantially centrally of said plate member, and a second plate member having an apertured portion at one edge engaged with said hook portion to secure the two plate members together and said yieldable finger means pressing against said apertured portion to hold it in engagement with the hook portion to prevent accidental disengagement while being adapted to be separated by a pull exerted at a predetermined edge of one of the plate members.

2. A snap fastener device comprising two sheet metal plate-like members, one of which has means to permit slidable attachment to a strap, a hook formed integral with one of said members, a hook-engaging portion presented by the other member and a pair of spring fingers formed from the plate which presents the hook, said spring fingers cooperating with the hook and being located adjacent to the sides thereof to engage and hold the hook-engaging portion against accidental separation, each plate and the elements presented thereby being formed from a single piece of metal.

3. A snap fastener device of the hook and eye type comprising, in combination, a one-piece plate part A having a hook 2 and two spring fingers 4 formed intermediate its edges, said fingers being spaced from each other at least the width of the hook, a second plate part B having a hook-engaging portion 7 provided with an aperture 8 through which the hook 2 passes when the plates are engaged and said hook-engaging portion 7 having a portion 9 snapped between the hook 2 and the spring fingers 4, as and for the purposes described.

4. A snap fastener device of the hook and eye type comprising, in combination, a one-piece plate part A having a hook 2 and two spring fingers 4 formed intermediate its edges, said fingers being spaced from each other at least the width of the hook, a second plate part B having a hook-engaging portion 7 provided with an aperture 8 through which the hook 2 passes when the plates are engaged, said hook-engaging portion 7 having a portion 9 snapped between the hook 2 and the spring fingers 4, as and for the purposes described, and a boss 3 pressed from said hook to cooperate with the spring fingers 4 for providing for snap fastening engagement between the hook 2 and the portion 9.

5. A snap fastener device comprising, in combination, a one-piece plate member formed from sheet metal and having a hook portion and yieldable finger means normally pressing toward said hook portion, said hook portion and said yieldable finger means being formed integral with the material of said plate member and being located substantially centrally of said plate member, and a second plate member having means for engagement with said hook portion to secure the two plate members together and said yieldable finger means pressing against said means provided by said second plate member, thereby to hold it in engagement with the hook portion to prevent accidental disengagement of the second plate member from the first plate member while being adapted to be separated by a pull exerted at a predetermined edge of one of said plate members.

In testimony whereof, I have signed my name to this specification.

GUSTAV JOHNSON.